United States Patent Office 3,686,146
Patented Aug. 22, 1972

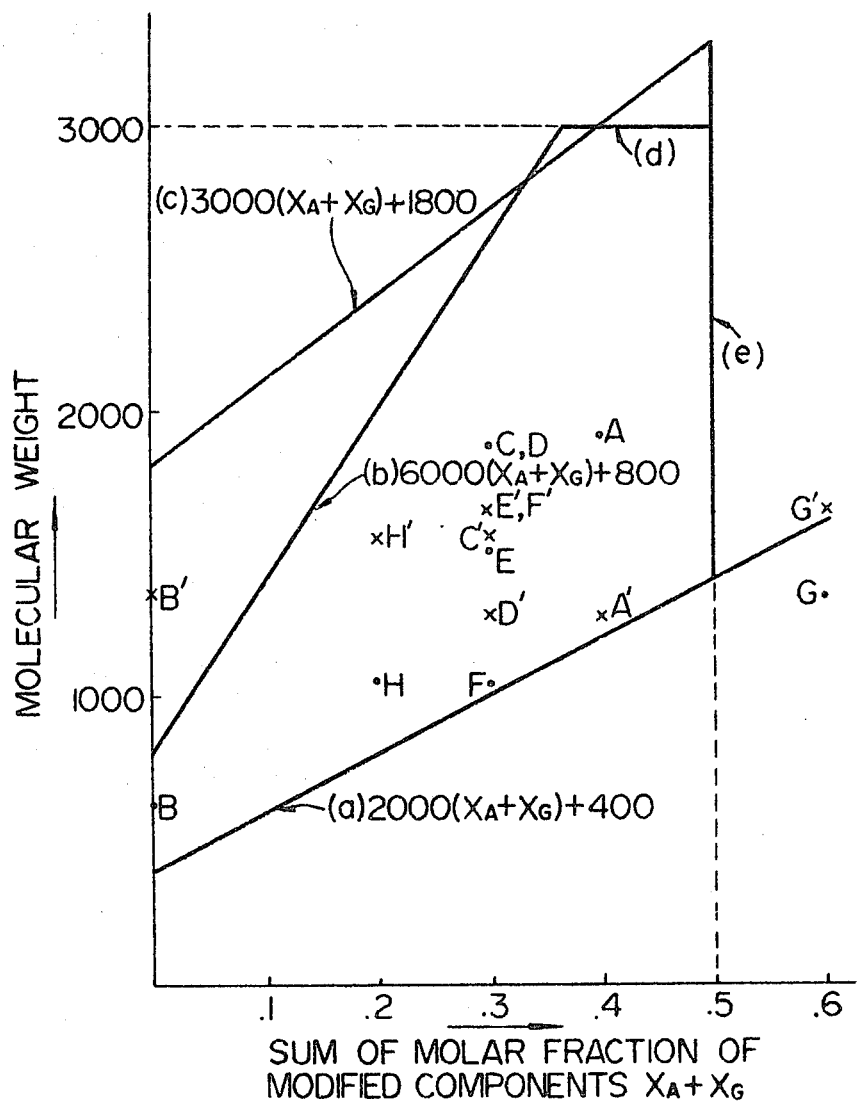

3,686,146
THERMOPLASTIC POLYURETHANES FOR ADHESIVES, COATINGS AND MOLDINGS
Hachiro Goto, Ibaraki, Japan, assignor to
Teijin Limited, Osaka, Japan
Filed Mar. 23, 1970, Ser. No. 21,846
Claims priority, application Japan, Mar. 25, 1969,
44/22,572
Int. Cl. C08g 22/10, 41/04
U.S. Cl. 260—75 NP — 9 Claims

ABSTRACT OF THE DISCLOSURE

Thermoplastic polyurethane of the formula

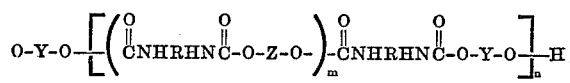

wherein m and n are integers of at least 1, having improved thermoplasticity, is prepared by reacting a diisocyanate of the formula

OCNRNCO with a hydroxyl-terminated compound of the formula HO—Z—OH where Z stands for residues selected from the group consisting of aliphatic polyether residues and aliphatic polyester residues which is liquid at a temperature at least 80° C. lower than the crystal melting point of a polyester of the formula HO—Y—OH where Y stands for polyester residues containing terephthalic acid and ethylene glycol as the main component and having hydroxyl groups at both ends to form a prepolymer and reacting such prepolymer with the polyester having a crystal melting point of 150 to 220° C., the reactions being carried out under the specified conditions.

---

The present invention relates to a thermoplastic polyurethane comprising a first segment consisting essentially of ethylene terephthalate chains and a second segment having a lower melting point than the first and being substantially regularly oriented in the chain and bonded without cross-linking occurring, the thermoplastic polyurethane having improved thermoplasticity and elasticity and particularly showing an excellent performance as an adhesive for sewing applications in the forms of film, tape, filaments, yarn, tow, knit and woven fabrics, non-wovens, etc. More specifically the present invention relates to a thermoplastic polyurethane produced by a process characterized by producing a pre-polymer by the reaction of a diisocyanate of the formula

OCNRNCO (1)

where R denotes residues selected from the group consisting of aliphatic residues, alicyclic residues and aromatic residues with a compound of the formula

HO—Z—OH (2)

where Z stands for residues selected from the group consisting of aliphatic polyether residues and aliphatic polyester residues, such compound being liquefied at a temperature at least 80° C. lower than the crystal melting point of a compound of formula

HO—Y—OH (3)

where Y stands for polyester residues containing terephthalic acid and ethylene glycol as the main component and having hydroxyl groups at both ends and reacting such pre-polymer with the polyester of Formula 3 having hydroxyl groups at both ends and a crystal melting point of 150 to 220° C. into a thermoplastic polyurethane of the formula

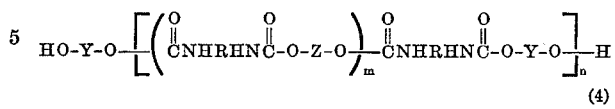

the reaction being carried out under the conditions where the following Formulas i, ii, iii and iv, preferably further condition (v) are satisfied.

(i) $M_Y \leq 3000$ where $M_Y$ stands for the molecular weight of polyester of Formula 3, (ii) $0 \leq X_A + X_G \leq 0.5$, preferably
$0.10 \leq X_A + X_G \leq 0.4$, more preferably
$0.15 \leq X_A + X_G \leq 0.35$ where Xa represents the mol fraction of an acid component in total acid components when the acid component other than terephthalic acid in the polyester of Formula 3 is employed and $X_G$ represents the mol fraction of a glycol component in total glycol components when the glycol component other than ethylene glycol is used (iii) $2000(X_A+X_G)+400 \leq M_Y \leq 6000(X_A+X_G)+800$ where $X_A$, $X_G$, and $M_Y$ have the same meaning as above, (iv) $2000(X_A+X_G)+400 \leq M_Z \leq 3000(X_A+X_G)+1800$ where $X_A$ and $X_G$ have the same meaning as above and $M_Z$ stands for the molecular weight of the compound of Formula 2, and (v) The molar ratio of diisocyanate of Formula 1 to the compounds of Formula 2 and Formula 3 is not over 1:1, preferably 0.80 to 0.98:1.

To date, various types of polyurethanes have been proposed and utilized for a variety of uses, and the present invention relates to a novel thermoplastic polyurethane.

It has been found that the thermoplastic polyurethane of Formula 4 produced under the conditions satisfying conditions (i), (ii), (iii) and (iv), preferably further condition (v) has excellent, improved properties as compared with conventional thermoplastic polyurethanes and that particularly the thermoplastic polyurethane of Formula 4 produced under the conditions in which requirement (ii), preferably $0.10 \leq X_A+X_G \leq 0.4$, more preferably
$0.15 \leq X_A+X_G \leq 0.35$, most preferably
$X_A+X_G = 0.27 \pm 0.07$ is satisfied together with the other conditions develops an excellent characteristic as an adhesive material of the hot-melt type and, for instance, is most suitable as a sewing material. In use, as an adhesive material, the thermoplastic material produced according to conditions (i), (ii), (iii) and (iv), preferably further (v), it is essential for it to have the degree of polymerization inhibited and to have a reduced specific viscosity of preferably 0.4 to 1.5, more preferably 0.5 to 1.3.

Accordingly it is the object of the present invention to provide a novel polyurethane of Formula 4 where two types of segments are oriented regularly and substantially in the straight chain, having an excellent thermoplasticity due to cohesion which holds the molecules of the segment containing ethylene terephthalate chains as main components without cross-linking occurring and having improved hardness, elasticity, etc.

It is another object of the present invention to provide a process for the production of thermoplastic polyurethane suitable for a hot-melt type of adhesive, particularly sewing material.

Further objects of the present invention will be made clear by descriptions below.

The thermoplastic polyurethane of this invention has two types of segments of intermediate polymer: one is an aromatic polyester of Formula 3 and the other polyhydroxyl compound of Formula 2. These two segments of intermediate polymer are regularly oriented and the terminals of the generated product end with hydroxyl groups of an aromatic polyester.

In preparing the thermoplastic polyurethane of the invention, a diisocyanate of Formula 1 is reacted with a compound of Formula 2 to obtain a pre-polymer, and then the pre-polymer is reacted with a polyester of Formula 3.

As diisocyanates of Formula 1, diisocyanates wherein R in the formula is a $C_6$ to $C_{10}$ aliphatic residue are desirable. Among such diisocyanates are hexamethylene diisocyanate, dimethyl hexamethylene diisocyanate, trimethyl hexamethylene diisocyanate, metaxylylene diisocyanate and paraxylylene diisocyanate.

Diisocyanates of Formula 1 in which R is an aromatic residue having $C_6$ to $C_{16}$, which may be substituted by halogen, lower alkyl, and lower alkoxy are also preferable. Among such diisocyanates are 2,4-tolylene diisocyanate, a mixture of 2,4-tolylene (80% by weight) and 2,6-tolylene diisocyanate (20% by weight), tetramethyl phenylene diisocyanate, diphenylmethane-4,4′-diisocyanate, metaphenylene diisocyanate, paraphenylene diisocyanate, naphthalene-1,5-diisocyanate, and diphenyl-4,4′-diisocyanate.

Among compounds in which R in Formula 1 is an alicyclic residue $C_6$ to $C_{13}$ alicyclic diisocyanates are preferable, for instance isophorone diisocyanate and dicyclohexylmethane diisocyanate.

The compound of Formula 2 to be used in the present invention is one in which Z is a residue selected from the group consisting of an aliphatic polyether residue and aliphatic polyester residue and which has hydroxyl groups at both ends. It is a compound in the form of liquid at temperatures at least 80° C. lower than the crystal melting point (150 to 220° C.) of the polyester of Formula 3.

Among compounds of Formula 2 are listed polymers or copolymers of cyclic oxides, e.g. ethylene oxide, epichlorohydrin, 1,2-propylene oxide, 1,2-alkylene oxide, tetrahydrofuran, etc.; polyethers produced by the polymerization of an alkylene oxide in the presence of basic catalyst on one hand and glycol, water, or primary amine on the other hand; polyesters produced by conventional methods from an aliphatic dicarboxylic acid, for instance succinic acid, glutaric acid, adipic acid, suberic acid, sebacic acid, azelaic acid, etc. and glycols, for instance ethylene glycol, 1,2-propylene glycol, 1,3-propylene glycol, 1,3-butylene glycol, tetramethylene glycol, diethylene glycol, triethylene glycol, pentamethylene glycol, hexamethylene glycol, etc.; polyesters partially compounded with phthalic acid, isophthalic acid, terephthalic acid, xylylene glycol, etc., which are in the form of liquid at a temperature at least 80° C. lower than the crystal melting point of combined polyester of Formula 3, HO—Y—OH and a mixture thereof.

Further as the polyester of Formula 3 to be used in the present invention is a compound which is a polyester residue, Y in Formula 3 consisting mainly of terephthalic acid and ethylene glycol, and containing ordinarily 50% or above, preferably 60% or above of terephthalic acid and xylylene glycol. The polyester may be composed only of terephthalic acid and ethylene glycol or contain acid components other than terephthalic acid and/or glycol components other than ethylene glycol. For hot-melt adhesion it is especially desirable that the polyester contain other acid components and/or other glycol components.

Among other acid components are dicarboxylic acids such as isophthalic acid, phthalic acid, parabenzoic acid (β-hydroxyethoxy)benzoic acid, 4,4′-diphenyl carboxylic acid, succinic acid, glutaric acid, adipic acid, suberic acid, sebacic acid, azelaic acid, fumaric acid, maleic acid, etc. and their lower alcohol esters; among other glycol components are propylene glycol, tetramethylene glycol, hexamethylene glycol, neopentyl glycol, diethylene glycol, etc.

One or more types of these acid components and/or glycol components besides terephthalic acid and ethylene glycol can be made into the polyester of Formula 3 by known polycondensation reaction.

In the invention, the reaction is carried out under conditions satisfying Formulas i to iv. That is, (i)  $M_Y \leq 3000$
(ii)  $0 \leq X_A + X_G = 0.5$
(iii)  $2000(X_A + X_G) + 400 \leq M_Y \leq 6000(X_A + X_G) + 800$
(iv)  $2000(X_A + X_G) + 400 \leq M_Z \leq 3000(X_A + X_G) + 1800$ Especially for hot-melt adhesion, it is desired that $X_A + X_G$ be $0.10 \leq X_A + X_G \leq 0.4$, more preferably $$0.15 \leq X_A + X_G \leq 0.35$$

most preferably $X_A + X_G = 0.27 \pm 0.07$.

A range of $0.3 \pm 0.03$ is advantageously used.

Further in this invention, the following condition (v) is more preferably satisfied:

(v) The molar ratio of diisocyanate of Formula 1 to the compound of Formula 2 and the polyester of Formula 3 should not be over 1:1; it is preferably 0.80 to 0.98:1. This means that the part originating from the diisocyanate in polyurethane is equal to, or less than, the part originating from compounds of Formulas 2 and 3 in molar percentage. Also condition (vi) is preferably satisfied.

(vi) The molar ratio of diisocyanate of Formula 1 to the compound of Formula 2 is 1.25 to 2.0:1, preferably 1.7 to 2.0:1, more preferably 1.8 to 2.0:1. Also the molar ratio of the compound of Formula 3 to the compound of Formula 2 is preferably 0.5 to 2.0:1 and more preferably 1.12 to 1.50:1.

In order that the invention may be more clearly understood, conditions (i) to (iv) will be described in more detail with reference to the diagram. In the diagram, $(a)$ is a line showing the molecular weight of the lower limit in which $M_Y$ and $M_Z$ vary according to the mol fraction $(X_A + X_G)$ of modified components. In like manner $(b)$ and $(d)$ shows the molecular weight of the upper limit in which $M_Y$ varies with changes in $(X_A + X_G)$ and $(c)$ shows the molecular weight of the upper limit for $M_Z$. The molecular weight outside this range, as will be understood by a comparison described later, is not suitable in the light of properties of the polyurethane obtained. When two or more acid components are blended and with terephthalic acid used and two or more glycol components are blended and used with ethylene glycol, $X_A + X_G$ is expressed as the sum of mol fraction of such two or more acid components and glycol components. In the diagram, the points shown with capital letters show molecular weight $M_Z$ of Formula 2 and molecular weight $M_Y$ of Formula 3 used in examples described later. Capital letters without apostrophes stand for $M_Y$ and those with apostrophes $M_Z$. Line $(d)$ in the diagram shows condition (i) and line $(e)$ condition (ii). Further when the thermoplastic polyurethane prepared by satisfying the range of conditions in the diagram is used as a textile adhesive, particularly sewing, an iron and a presser are usually and often employed. Consequently, it is required to complete adhesion operations in a short time of heating and pressing. In such uses, the reduced specific viscosity of the thermoplastic polyurethane is preferably within a range of 0.4 to 1.5.

Polyurethanes having two segments obtainable by the process of the present invention are obtained by reacting the diisocyanate of Formula 1 with a compound of Formula 2 into a pre-polymer and then by reacting the prepolymer with a polyester of Formula 3. The reaction between the diisocyanate of Formula 1 and compound of Formula 2 can be carried out in the following way:

The intermediate polymer of Formula 2, HO—Z—OH, having a low melting point, is heated; it is dehydrated at 80 to 120° C., under 2 mm. Hg to 10 mm. Hg; diisocyanate in an amount of preferably 1.5 to 2.0 equivalents is added.

The pre-polymer thus obtained is mixed with a polyester intermediate polymer of formula, HO—Y—OH in an amount greater than the diisocyanate equivalent in the pre-polymer and a crystal melting point of 150 to 220° C. In this case, the compound shown is previously melted at a temperature higher than the melting point. Then it may be mixed with the prepolymer or a two-compound mixer may be used for mixing them.

The compound of formula HO—Y—OH may be dissolved in a solvent and then blended with the pre-polymer at a temperature of 80 to 120° C. The method using a solvent has an advantage in that uniform mixing can be done at a lower temperature and although it is convenient to use the produced polyurethane as an as-produced solution, the reaction is slow when compared with solid phase reaction and care must be taken to avoid side reaction with the solvent. The polyurethane thus produced can be thermoplastically used without any hardening treatment.

The thermoplastic polyurethane of this invention has uses as an adhesive, a coating agent as well as a molded articles made by injection, extrusion, compression, calendering, etc. The thermoplastic polyurethane has ethylene terephthalate linking in the molecular chains; consequently it has an excellent affinity toward polyethylene terephthalate molds such as film and fibers and is suitable as a coating agent, an adhesive, and a laminating agent for these things. Since it is characterized in that it softens within a sensitive range of temperatures as compared with conventional thermoplastic polyurethane, it is easy to select a stable molding condition. It is also excellent as a melt-coating agent and a hot-melt adhesive. Particularly it has developed an excellent performance as a sewing adhesive material in the forms of film, tape, filament, yarn, tow, fabrics, and non-wovens. In using a sewing adhesive, it is necessary to carry out adhesion procedure under conditions as will not injure the performance of the textile material, and adhesion procedure of high efficiency is required to serve the purpose of sewing. Further adhesive strength is required to hold as much strength as is obtained by conventional sewing process. For instance, when the often-used heat pressing method is employed, it is essential to finish the adhesion procedure at 160° C. or below in 20 sec. and the strength should usually be a peel strength of 1.5 kg./cm. or above.

The process of this invention will be explained below with reference to examples. In these examples "parts" are given in parts by weight. Also reduced specific viscosity in the examples is expressed in numerical values at 30° C., 1 gr./100 cc. with the use of orthochlorophenol as a solvent.

Thickness of adhesive: 150μ
Size of film adhesive: 100 mm. x 25 mm.
Sample cloth applied for adhesion: Polyester filament 50 de./24 filtricot (28 gage) 110 g./m.² 100 mm. x 50 mm.
Adhesion procedure:
 AATCC scorch tester—Load: 4 lbs., Pressing time: 20 sec., Temperature at which the high adhesive power is obtained is defined as adhesion temperature.
Adhesive strength:
 T-typed peel strength test—Width: 10 mm., Head speed: 40 mm./min., Gauge length: 20 mm.

The molecular weight of the intermediate polymer including ethylene terephthalate of the present invention has been determined by measuring hydroxyl and carboxylic end groups. As has been the case with a high molecular compound, there is an expression in which reduced specific viscosity, intrinsic viscosity and relative viscosity are used. Intermediate polymer in the present invention is one which has a molecular weight having usually a relative viscosity of 2.0 or below, usually a reduced specific viscosity of 0.2 or below, and usually an intrinsic viscosity of 0.15 or below, for a 5 gr./100 cc. solution prepared with the use of orthochlorophenol as a solvent.

EXAMPLE 1

129 parts of polytetramethylene glycol having a molecular weight of 1,290 (OH value is 87) was heated to 80° C.; and dehydrated and dried 60 min. under a reduced pressure of 3 mm. Hg. Then it was maintained at 80° C. and 50 parts of 4,4'-diphenylmethane diisocyanate which was heated to 50° C. and dissolved were added. Reaction with agitation was carried out at 100° C. for 60 min. The product is a pre-polymer from polytetramethylene and 4,4'-diphenylmethane diisocyanate.

Separately, 200 parts of polyester which have been prepared as described later so that its composition is terephthalic acid (80)/isophthalic acid (20)/diethylene glycol (20)/ethylene glycol (80) having a molecular weight of 1,910 (OH value is 58.2 and COOH value is 0.7) and showing an endothermic peak at 184° C. in differential thermal analysis, were dissolved in 280 parts of dehydrated nitrobenzene at 180° C. After dissolving, while kept at 130° C., it was mixed with the previously prepared prepolymer quickly. Viscosity increased and the temperature of reaction solution went up to as high as 140° C. After continuing the reaction for 120 min., the reaction product was poured into 1,000 parts of methanol and precipitated. It was pulverized and washed with 1000 parts of methanol to remove most of the nitrobenzene. The powder thus obtained was dried in vacuo for 16 hr. at 80° C. The polyurethane powder thus produced was compression molded at 190° C. The polyurethane obtained has a hardness of 68 (JIS), a pull strength of 395 kg./cm.² and an elongation of 750%. The present example is concerned with $X_A+X_G=0.4$ and a combination of molecular weight as shown by A and A' in the diagram. The example was carried into effect under the conditions in which total NCO/total OH mol=0.967.1, HO—Y—OH/HO—Z—OH mol ratio 1.05:1, and HO—Y—OH/HO—Z—OH weight ratio=1.55:1.

Preparation of polyester consisting of terephthalic acid/isophthalic acid/diethylene glycol/ethylene glycol:

The polyester copolymer used in Example 1 was prepared as hereunder. 156 parts of dimethyl terephthalate, 38 parts of dimethyl isophthalate, 143 parts of ethylene glycol and 22 parts of diethylene glycol were mixed and heated with the use of 0.6 part of zinc acetate as catalyst. Around 130° C., uniform dissolving occurred; then around 150° C. methanol began distilling off. The temperature was raised up to 210° C., and, after about 60 parts of methanol were distilled off, was lowered to 150° C., and subsequently it was gradually raised again to permit ethylene glycol to distill off for 20 min. at 30 mm. Hg and 40 min. at 10 mm. Hg. The polymer was heated for 60 min. at 220° C., 3 mm. Hg, and after a total of 87 parts completed distillation, the reaction was stopped.

For the polyester thus produced, the end hydroxyl group was determined by the procedure described in "Makromol Chem" 26, 238 (1958) to obtain 58.2 as OH value. A COOH value of 0.7 was obtained by direct titration, and a molecular weight of 1910 was determined. Same 50 mg. of an oven-dried specimen were given differential thermal analysis in the air at an increasing temperature of 10° C./min. and endothermic peak due to crystal melting was seen at 184° C. Further melting point, 156° C. roughly corresponding to the temperature at which absorption of heat began in differential thermal analysis was obtained with a micromelting point indicator.

EXAMPLE 2

685 parts of polytetramethylene glycol having an OH value of 82 and a molecular weight of 1,370 were heated to 100° C. in nitrogen atmosphere and dried in dehydration for 20 min. under a reduced pressure of 5 mm. Hg. Subsequently 182 parts of xylylene diisocyanate (meta/ para=80/20) were added at 80° C. and reacted at 90° C. for 60 min. to produce a pre-polymer of poly-tetramethylene glycol and xylylene diisocyanate. The pre-polymer was reacted under the condition,

OCNRNCO/HO—Z—OH=1.94:1

(mol ratio). Separately 347 parts of polyethylene terephthalate oligomer prepared as described later, having a crystal melting point of 218° C., an OH value of 181.5, and a COOH value of 0.2 (molecular weight 617) were dissolved in 500 parts of dehydrated nitrobenzene and added to the pre-polymer at 120° C. while vigorously agitated. Immediately, the reaction began and temperature rapidly increased. The reaction was continued at 120° C. for 90 min. and the product was shifted into a tray for cooling. The cooled product is a rigid gel containing about 30% by weight of nitrobenzene and having a high elasticity. This was cut 2 mm. square and placed in 3,000 parts of water. While water vapor was being poured in, it was heated to remove most of the nitrobenzene and dried in dehydration at 80° C., for 20 hr. under a reduced pressure of 5 mm. Hg. As in Example 1, it was compression molded.

The hardness (JIS) was 76, pull strength 460 kg./cm.$^2$, and elongation 680%. This product was reacted under the conditions: total NCO/total OH=0.97:1 (mol ratio), HO—Y—OH/HO—Z—OH=1,123:1 (mol ratio), as shown by B and B' in the diagram.

The polyethylene terephthalate oligomer was prepared as follows. 1,000 parts of dimethyl terephthalate, 3,000 parts of ethylene glycol, and 3 parts of zinc acetate were mixed and heated for distillation of methanol at 180° C. After about 300 parts of methanol was distilled off, the reaction was stopped. The polymer was cooled to 80° C. and poured into 8000 parts of warm water at 80° C. Subsequently, the mixture was heated to 95° C. and hot filtered at this temperature. The filtration residue was further thoroughly washed with hot water at 95° C. When the filtrate was cooled, crystals separated. In succession, the filtrate was cold filtered. This is di-$\beta$-hydroxyethyl terephthalate having a melting point of 110° C.

For 4 hrs. at 220° C. under normal pressure 1000 parts of di-$\beta$-hydroxyethyl terephthalate were heated. Afterwards it was cooled and pulverized. Into 7,000 parts of water it was placed and boiled. One or 2 hr. later it was hot filtered at 95° C. Unreacted di-$\beta$-hydroxyethyl terephthalate was contained in the filtrate. The filtrated residue was dried, and it was heated and dissolved in tetrachloroethane. It was hot filtered at 60° C., and the filtrate was cooled. The crystal thus produced was again heated in tetrachloroethane, dissolved, and recrystallized. The produced crystal has a melting point of 202° C. and an endothermic peak of 208° C. in differential thermal analysis. As in Example 1, OH and COOH values were determined resulting in an OH value of 181.5 and a COOH value of 0.2 (molecular weight=617).

EXAMPLE 3

206 parts of polyethylene propylene adipate (EG/PG=70/30)

having an OH value of 71.6, a COOH value of 1.35 and a molecular weight of 1.570 were heated to 80° C. and dried for 60 min. under a reduced pressure of 10 mm. Hg. 66 parts of diphenylmethane-4,4'-diisocyanate was heated and added. A polymer was prepared by reaction for 60 min. The molar ratio of OCNRNCO/HO—Z—OH was 2.0:1.

Some 276 parts of polyester consisting of terephthalic acid (70)/isophthalic acid (30)/ethylene glycol prepared by the procedure described in Example 1 (endothermic peak of 192° C., melting point of 170° C., OH value of 59.2, COOH value of 0.4, molecular weight of 1,880) were heated to 140° C., dehydrated under 3 mm. Hg for 60 min., dissolved in 500 parts of dioxane anhydride, maintained at 80° C. and blended with the pre-polymer. After mixing, the mixture was continuously heated at 95° C. for 100 min. This polyurethane dioxane solution can directly be used for the manufacture, coating, and adhesion of film by stretch methods. The film prepared from this solution, having a thickness of 160 microns had a strength of 4 kg./cm. and an elongation of 980%. This film welded at 150° C. The polyurethane in this example had a molar ratio of total NCO/total OH of 0.95:1, a molar ratio of HO—Y—OH/HO—Z—OH of 1.125:1, and a weight ratio of HO—Y—OH/HO—Z—OH of 1.292:1. This example was a combination of C and C' in the diagram.

EXAMPLE 4

The procedure described in Example 3 was repeated with the exception of the use of 168 parts of polytetramethylene glycol having an OH value of 87.0, a COOH value of 0.1 and a molecular weight of 1290 instead of polyethylene adipate and the use of 240 parts of dimethyl formaldehyde as a solvent. After the conclusion of reaction the reaction product was placed in a tray. After cooling it was cut 2 mm. square and after most of the dimethyl formaldehyde was removed with hot water, it was dried at 60° C. under reduced pressure.

The properties of the polyurethane after molding are as follows: Hardness (JIS) is 74, pull strength 430 kg./cm.$^2$, and elongation 570%. This example had a weight ratio of HO—Y—OH/HO—Z—OH of 1.63:1, and was a combination of C and D' in the diagram.

EXAMPLE 5

Some 330 parts of polyethylene propylene adipate (EG/PG=70/30) having an OH value of 67.9, a COOH value of 0.20 and a molecular weight of 1,650 were heated to 80° C. and dried under a reduced pressure of 10 mm. Hg for 60 min. In succession, 76 parts of xylylene diisocyanate added at 80° C. and reacted for 60 min. with agitation.

In sucession 344 parts of a polyester of terephthalic acid (70)/adipic acid (30)/ethylene glycol prepared as described later, having an OH value of 73.1, a COOH value of 0.6 and a molecular weight of 1,520 were dehydrated by a known method and dissolved in 500 parts of dioxane. The solution thus obtained was added to the above at 80° C. at one time. Some 0.5 part of dibutyl tin dilaurate was added with agitation to promote reaction and for 60 min. the reaction was carried out. This polyurethane solution has a concentration of 60%. The solution was separated into two parts, and one of the parts was treated by the hot knife coat method to make a film of 150 microns from a mold releasing surface. This film was inserted between aluminum foils, polyethylene terephthalate films and polyethylene terephthalate plain fabrics respectively and hot pressed for 10 sec. at 160° C.

Peel strength, kg./cm.
Aluminum foils therebetween (broken) _____ 2.6
Polyethylene terephthalate film therebetween _____ 3.0
Polyethylene terephthalate knits therebetween _____ 4.5

The other solution was diluted to 40% solution. To 100 parts of this 40% solution 2 parts of a 75% ethyl acetate solution of trimethylolpropane adduct of tolylene diisocyanate were then added. A polyester film and polyester taffeta were coated with this solution. After drying, they were heated to 120° C. for 10 min. These coated articles have soft, coated surfaces with an excellent abrasion resistance.

The water resistance of the coated polyester taffeta was 1050 mm. Hg, and either film or fabrics can be high frequency welded. This was a combination of F and F'. The reaction conditions were $X_A + X_G = 0.3$; total NCO/total OH=0.961:1 (molar ratio);

HO—Y—OH/HO—Z—OH=1.13:1

(molar ratio);

HO—Y—OH/HO—Z—OH=1.43:1

(weight ratio). This example was a combination of E and E'. The polyester of terephthalic acid (70), adipic acid (30), and ethylene glycol of the example were prepared as follows:

Some 351 parts of adipic acid were added to 1,240 parts of ethylene glycol heated to 80° C., and heated. Water began to distill off at 160° C. and the temperature was raised up to 220° C. to distill off 80 parts of water. The temperature was then lowered to 150° C., 1,097 parts of dimethyl terephthalate and 1.5 parts of zinc acetate were added, and the temperature was again raised. At 140° C. methanol began to distill off. Further while the temperature was being raised for 3 hrs., 330 parts of methanol were distilled off until the temperature had reached 220° C. In succession 635 parts of ethylene glycol were distilled off for 4 hrs. at the same temperature while pressure was gradually being reduced. The reaction was stopped. The product had an endothermic peak of 172° C. in differential thermal analysis; the product had a melting point of 162° C., an OH value of 73.1 a COOH value of 0.6, and a molecular weight of 1,520.

EXAMPLE 6

Some 165 parts of polyethylene propylene adipate (EG/PG=70/30) having an OH value 67.9, a COOH value of 0.20 and a molecular weight of 1,650 were heated to 100° C. and dried under a reduced pressure of 10 mm. Hg for 60 min. In succession 37 parts of xylylene diisocyanate were added and after a 60 mins.' reaction, a pre-polymer were prepared. From 125 g. of terephthalic acid, ethylene glycol (70), and diethylene glycol (30) were heated and melted in nitrogen atmosphere at 170° C. and the mixture was maintained at 150° C. The prepolymer was added with agitation. After uniform mixing, the product was emptied into a tray while under fluid conditions.

Then the product was heated at 80° C. in nitrogen atmosphere for 4 hrs. and cooled. Polyurethane was cut 3 mm. square. With a plunger-type molding machine it was extrusion molded under a pressure of 50 kg./cm.² at a caliber of 1 mm., the flowing starts at 150° C., and under a pressure of 100 kg./cm.² it starts at 145° C. This is polyurethane which is easy to calender. Total NCO/total OH=0.99:1 (molar ratio);

OCNRNCO/HO—Z—OH=1.968:1

(molar ratio); HO—Y—OH/HO—Z—OH=1.195:1 (molar ratio). This is shown by F and F' in the diagram.

Comparison 1

A pre-polymer was prepared by dehydrating 165 parts of polyethylene propylene adipate (EG/PG=70/30) (OH value=67.9, COOH value=0.20, molecular weight= 1650) used in Example 6 at 80° C., under a reduced pressure of 5 mm. Hg for 60 hr., by mixing it with 50 parts of 4,4'-diphenylmethane diisocyanate at 80° C. and by carrying out the reaction for 60 min.

Separately, 140 parts of terephthalic acid (80)/adipic acid (20)/ethylene glycol (60)/diethylene glycol (40) (OH value=83.0, COOH value=0.2, molecular weight= 1350) prepared as in Example 5 were dried at 110° C.

under 5 mm. Hg, for 60 min. and were then dissolved in 200 parts of dioxane. While being kept at 90° C., the copolymer was added to the above prepolymer at one time, and the reaction was carried out at 90° C. for 90 min. The product was emptied into a tray. After 24 hr., the product was cut 2 mm. square and was freed from a solvent by repeating 3 washings for 40 min. each with hot water. Then it was dehydrated under a reduced pressure of 2 mm. Hg at 60° C. for 24 hr. This polyurethane softens at 80° C. and is apt to be deformed when it is left at normal temperature. Thus it is unsuitable for the objects of the invention, for instance, molding and adhesion. The polyester having ethylene terephthalate chains, employed in this comparison did not show an endothermic peak in differential thermal analysis. This was inside the favorable conditions of the process of the invention with the exception of degree of deformation and range of molecular weight. Total NCO/total OH= 0.944:1 (molar ratio); OCNRNCO/HO—Z—OH=2.0:1 (molar ratio); HO—Y—OH/HO—Z—OH=1.12:1 molar ratio). This is a combination of G and G' in the diagram.

EXAMPLE 7

471 parts of one which had an OH value of 71.6, a COOH value of 1.35, and a molecular weight of 1,570 was dehydrated at 80° C. for 60 min. under a reduced pressure of 5 mm. Hg. The system was maintained at 80° C. The 150 parts of 4,4'-diphenylmethane diisocyanate were heated at 70° C., dissolved and added. With a reaction at 100° C. for 60 min., a prepolymer was prepared.

Separately 362 parts of polyester of terephthalic acid (80)/isophthalic acid (20)/ethylene glycol prepared by the procedure described in Example 1, having an OH value of 106.5, a COOH value of 0.3, a molecular weight of 1,050, an endothermic peak in differential thermal analysis at 198° C., and a melting point of 172° C. were dehydrated at 130° C. under a pressure of 10 mm. Hg for 60 min. The polyester was dissolved in 500 parts of anhydrous dimethyl formaldehyde; and added to the prepolymer at 130° C. at one time. The reaction was continued for 100 min. at 130° C., and the product was emptied into a tray. After 24 hr. it was cut 2 mm. square. With 2,000 parts of hot water it was given 3 washings for removing the solvent, each for 40 min. It was then dehydrated at 80° C., for 20 hr., at 3 mm. Hg and successfully injection molded into a dumbbell form.

Hardness (JIS): 74, pull strength: 450 kg./cm.²; elongation: 600%. Total NCO/total OH=0.93:1 (molar ratio) OCNRNCO/HO—Z—OH=2.0:1 (molar ratio), HO—Y—OH/HO—Z—OH=1.15:1 (molar ratio). This was a combination of H and H' in the diagram.

EXAMPLE 8

The procedure in Example 1 was carried out with the exception to alterations of prepolymers, of types of polyester of Formula 3, of $M_Z$, $M_Y$, $X_A$, $X_G$, etc. In the table are also given the results of Examples 1 to 7 and Comparison 1. Adhesion was carried out for 20 sec. at an indicated temperature.

TABLE 1 (NUMBER 1)

| | Prepolymer of— | | | | Reaction temperature (° C.) |
|---|---|---|---|---|---|
| | | HO-Z-OH | | | |
| Number | OCNRNCO (part) | (Part) | Temperature at to be liquid (° C.) | $M_Z$ | |
| Example: | | | | | |
| 1 | 4,4'-diphenylmethane diisocyanate (50). | Polytetramethylene glycol (129). | ≦45 | 1,290 (OH value 87) | 100 |
| 2 | XDI (188) | PTMG (685) | ≦45 | 1,370 (OHV 82) | 90 |
| 3 | MDI (66) | PEA (206) | ≦60 | 1,570 (OHV 71.6) | 80 |
| 4 | do | PTMG (168) | ≦45 | 1,290 (OHV 87) | 80 |
| 5 | XDI (76) | PEPA (330) | ≦50 | 1,650 (OHV 67.9) | 80 |
| 6 | XDI (50) | PEPA (165) | ≦50 | do | 100 |
| Comparison 1 | do | PEPA (165) | ≦50 | do | 80 |

TABLE 1 (NUMBER 1)—Continued

| | Prepolymer of— | | | | |
|---|---|---|---|---|---|
| | | HO-Z-OH | | | Reaction temperature (° C.) |
| Number | OCNRNCO (part) | (Part) | Temperature at to be liquid (° C.) | Mz | |
| Example: | | | | | |
| 7 | XDI (180) | PBA (600) | ≤45 | 1,204 (OHV 92.8) | 90 |
| 8 | MDI (25) | PPG (75) | (¹) | 1,500 (OHV 74.8) | 60 |
| 9 | XDI (93) | PES (265) | ≤50 | 1,060 (OHV 105.8) | |
| 10 | IPDI 21 | PEA (82) | ≤50 | 1,650 (OHV 69.7) | |
| 11 | TMDI 20 | PEA (82) | ≤50 | ...do... | |
| 12 | NDI 41 | PEA (165) | ≤50 | ...do... | |
| 13 | HMDI 33 | PEA 102 | ≤45 | 1,016 (OHV 110.0) | |
| Comparison 2 | XDI (18) | PEA 130 | ≤60 | 1,570 (OHV 71.6) | 120 |
| Comparison 3 | MDI (50) | PEA 102 | | 1,016 (OHV 110.0) | 100 |

¹ Normal temp. and under.

NOTE.—See note at bottom of Table 1 (Number 3).

TABLE 1 (NUMBER 2)

| | HO-Y-OH | | | | | | |
|---|---|---|---|---|---|---|---|
| Number | Parts by weight | Crystal melting point (° C.) | M_Y | Molar fraction ¹ | X_A | Molar fraction ² | X_G | Reaction temperature |
| Example: | | | | | | | | |
| 1 | 200 | 184 | 1,910 (OHV=58.2) | Isophthalic acid | 0.2 | Diethylene glycol | 0.2 | 130–140 |
| 2 | 347 | 218 | 617 (OHV=181.5) | ...do... | 0 | | 0 | 120 |
| 3 | 276 | 170 | 1,880 (OHV=59.2) | ...do... | 0.3 | | 0 | 80 |
| 4 | 276 | 170 | 1,880 (OHV=59.2) | ...do... | 0.3 | | 0 | 80 |
| 5 | 344 | 174 | 1,520 (OHV=73.1) | Adipic acid | 0.3 | | 0 | 80 |
| 6 | 125 | 161 | 1,050 (OHV=67.9) | | 0 | Diethylene glycol | 0.3 | 150 |
| Comparison 1 | 140 | Nil | 1,350 (OHV=83.0) | Adipic acid | 0.2 | ...do... | 0.4 | 90 |
| Example: | | | | | | | | |
| 7 | 800 | 182 | 1,605 (OHV=67.5) | Isophthalic acid | 0.2 | | 0 | 140 |
| 8 | 110 | 172 | 1,980 (OHV=55.3) | ...do... | 0.3 | | 0 | 130 |
| 9 | 400 | 170 | 1,570 | Isophthalic acid (0.25); Adipic acid (0.05). | 0.3 | | 0 | 150 |
| 10 | 100 | 172 | 1,980 | Isophthalic acid | 0.3 | | 0 | 140 |
| 11 | 100 | 172 | 1,980 | ...do... | 0.3 | | 0 | 140 |
| 12 | 200 | 172 | 1,980 | ...do... | 0.3 | | 0 | 140 |
| 13 | 115 | 210 | 1,110 | ...do... | 0.1 | | 0 | 100 |
| Comparison 2 | 26 | 172 | 1,980 (OHV=55.3) | ...do... | 0.1 | | 0 | 130 |
| Comparison 3 | 370 | 178 | 3,620 (OHV=31.3) | ...do... | 0.3 | | 0 | 150 |

¹ Acid component except terephthalic acid.
² Glycol component other than ethylene glycol.
³ With prepolymer (C).

NOTE.—See note at bottom of Table 1 (Number 3).

TABLE 1 (NUMBER 3)

| | OCNRNCO at— | | Polyurethane | | |
|---|---|---|---|---|---|
| Number | (HO-Z-OH) + (HO-Y-OH) molar ratio | HO-Z-OH molar ratio | Adhesive temperature | Peel strength, kg./cm. | Reduced specific viscosity, η sp./c. |
| Example: | | | | | |
| 1 | 0.976:1 | 2.00:1 | 155 | 2.8 | 1.32 |
| 2 | 0.970:1 | 2.00:1 | 170 | 2.2 | 1.49 |
| 3 | 0.950:1 | 2.00:1 | 145 | 3.3 | 1.03 |
| 4 | 0.950:1 | 2.00:1 | 165 | 3.6 | 1.30 |
| 5 | 0.961:1 | 2.00:1 | 145 | 4.5 | 0.96 |
| 6 | 0.979:1 | 1.97:1 | 120 | 2.1 | 0.76 |
| Comparison 1 | 0.994:1 | 2.0:1 | 120 | 1.0 | 0.88 |
| Example: | | | | | |
| 7 | 0.959:1 | 1.92:1 | 196 | 3.5 | 0.74 |
| 8 | 0.947:1 | 2.0:1 | 130 | 2.6 | 0.51 |
| 9 | 0.979:1 | 1.98:1 | 140 | 3.8 | 1.01 |
| 10 | 0.944:1 | 1.90:1 | 140 | 3.7 | 0.95 |
| 11 | 0.950:1 | 1.92:1 | 140 | 3.2 | 0.95 |
| 12 | 0.928:1 | 1.95:1 | 150 | 3.3 | 0.84 |
| 13 | 0.963:1 | 1.96:1 | 125 | 2.6 | 0.97 |
| Comparison 2 | 0.998:1 | 1.16:1 | 160 | 1.1 | 1.46 |
| Comparison 3 | 0.988:1 | 1.99:1 | 170 | 2.1 | 1.43 |

NOTES:
PTMG=polytetramethylene glycol
PEPA=Polyethylene propylene adipate
IPDI=Isophorone diisocyanate
NDI=1,5 naphthalene diisocyanate
PPG=Polypropylene glycol
PEA=Polyethylene adipate
PBA=Polybutylene adipate
PES=Polyethylene sebacate
XDI=Xylylene diisocyanate (p/m)=20/80
TMVI=Trimethyl hexamethylene diisocyanate
HMDI=Hexamethylene diisocyanate
M=Molecular weight
η sp./c.= Reduced specific viscosity at 30° C., 1 g./100 cc. concentration, with ortho-chlorophenol as a solvent
AT=Adhesion temperature in ° C.
PS=Peel strength, kg./cm.

Comparison 4.—Comparison for adhesion power

According to the procedure described in this text adhesion was carried out, and the following results were obtained:

| | Adhesive temperature, °C. | Time seconds | Peel strength kg./cm. | Reduced specific viscosity |
|---|---|---|---|---|
| Polyamide 6-66-610 three copolymerized nylon (Zytel 69) (Du Pont) | 170 | 20 | 1.6 | |
| Polyamide N-methoxymethyl-6 nylon | 160 | 20 | 1.6 | |
| Polyurethane Desmodur (716) (Bayer) | 150 | 20 | 1.2 | 2.31 |
| Polyurethane Estane 5703 (B. F. Goodrich) | 170 | 20 | 1.3 | 1.21 |
| Polyurethane Paraprene 228 (Nihon polyurethane) | 180 | 20 | 1.6 | 2.29 |
| Polyurethane and vinyl acetate copolymer, VAc=28% (Erbax 150) (Du Pont) | 150 | 20 | 1.8 | |
| Example: | | | | |
| 2 | 170 | 20 | 2.2 | 1.49 |
| 5 | 140 | 20 | 4.2 | 0.96 |
| 8 | 130 | 20 | 2.6 | 0.51 |
| 9 | 140 | 20 | 3.8 | 1.01 |

I claim:
1. A thermoplastic polyurethane prepared by reacting: a compound of the formula:

$$\text{HO—Z—OH} \qquad (2)$$

which is an aliphatic polyether or an aliphatic polyester and a diisocyanate of the formula:

$$\text{OCNRNCO} \qquad (1)$$

wherein R is a divalent aliphatic, alicyclic or aromatic group to form a prepolymer;
and reacting said prepolymer with a compound of the formula:

$$\text{HO—Y—OH} \qquad (3)$$

which is a polyester prepared from terephthalic acid and ethylene glycol as essential components, said compound (3) having a crystal melting point of 150° to 220° C. said compound (2) being liquid at a temperature at least 80° C. lower than the crystal melting of said compound (3); said compound $$\text{HO—Y—OH}$$

(3) and compound HO—Z—OH (2) satisfying the following conditions:

(i) $\qquad M_Y \leqq 3000$ wherein $M_Y$ represents the molecular weight of the compound of Formula 3;

(ii) $\qquad 0 \leqq X_A + X_G \leqq 0.5$ wherein $X_A$ represents the sum of molar fractions of acid components other than terephthalic acid to total acid components, and $X_G$ stands for the sum of molar fractions of glycol components other than ethylene glycol to total glycol components;

(iii) $2000 \ (X_A+X_G)+400 \leqq M_Y \leqq 6000 \ (X_A+X_G)+800$ where $X_A$ and $M_Y$ have the same meanings as above; and (iv) $2000 \ (X_A+X_G)+400 \leqq M_Z \leqq 3000 \ (X_A+X_G)+1800$ where $X_A$ and $X_G$ have the same meanings as above, and $M_Z$ is the molecular weight of said compound of Formula 2, the ratio of NCO groups to total OH groups being 0.80–0.98:1.

2. The polyurethane of claim 1 wherein $X_A+X_G$ is $0.15 \leqq X_A+X_G \leqq 0.4$.

3. The polyurethane of claim 2 wherein $X_A+X_G$ is $0.18 \leqq X_A+X_G \leqq 0.35$.

4. The polyurethane of claim 1 wherein the molar ratio of said diisocyanate of Formula 1 to said compound of Formula 2 is 1.25–2.0:1.

5. The polyurethane of claim 1 wherein the molar ratio of said diisocyanate of Formula 1 to said compound of Formula 2 is 1.7–2.0:1.

6. The polyurethane of claim 1 wherein the reaction of said diisocyanate of Formula 1 and said compound of Formula 2 is conducted at a temperature of 40 to 150° C.

7. The polyurethane of claim 1 wherein the reaction of said prepolymer and said compound of Formula 3 is conducted at a temperature of 60 to 200° C.

8. The polyurethane of claim 1 wherein said polyurethane has a reduced specific viscosity of 0.4–1.5 as measured at 30° C. for a one gram sample in 100 cc. of orthochlorophenol.

9. The polyurethane of claim 1 wherein said polyurethane has a reduced specific viscosity of 0.4–1.3 as measured at 30° C. for one gram sample in 100 cc. of orthochlorophenol.

References Cited
UNITED STATES PATENTS

| | | | |
|---|---|---|---|
| 2,801,648 | 8/1957 | Anderson et al. | 138—74 |
| 3,248,373 | 4/1966 | Barringer | 260—77.5 |
| 3,357,954 | 12/1967 | Kirkaldy | 260—75 |
| 3,496,045 | 2/1970 | Keberle et al. | 156—331 |
| 3,001,971 | 9/1961 | Scott et al. | 260—47 |
| 3,004,939 | 10/1961 | Varvaro | 260—22 |
| 3,012,987 | 12/1961 | Ansul | 260—45.4 |
| 3,284,539 | 11/1966 | McElroy | 260—858 |

DONALD E. CZAJA, Primary Examiner

H. S. COCKERAM, Assistant Examiner

U.S. Cl. X.R.

161—190; 260—858

UNITED STATES PATENT OFFICE
CERTIFICATE OF CORRECTION

Patent No. 3,686,146          Dated August 22, 1972

Inventor(s) HACHIRO GOTO

It is certified that error appears in the above-identified patent and that said Letters Patent are hereby corrected as shown below:

Claim 1, Column 14, line 7, after "$X_A$", insert --$X_G$--

Signed and sealed this 23rd day of January 1973.

(SEAL)
Attest:

EDWARD M. FLETCHER, JR.
Attesting Officer

ROBERT GOTTSCHALK
Commissioner of Patents